(12) United States Patent
Baron et al.

(10) Patent No.: US 11,459,047 B2
(45) Date of Patent: Oct. 4, 2022

(54) TOLERANCE COMPENSATION SYSTEM FOR SETTING A JOINT PATTERN BETWEEN TWO OUTER TRIM ELEMENTS TO BE MOUNTED IN THE REGION OF A VEHICLE PILLAR OF A MOTOR VEHICLE

(71) Applicant: Bayerische Motoren Werke Aktiengesellschaft, Munich (DE)

(72) Inventors: Fritz Baron, Dingolfing (DE); Klaus Sammer, Malgersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 16/864,616

(22) Filed: May 1, 2020

(65) Prior Publication Data
US 2020/0255075 A1    Aug. 13, 2020

Related U.S. Application Data

(63) Continuation of application No. PCT/EP2018/076014, filed on Sep. 25, 2018.

(30) Foreign Application Priority Data

Nov. 2, 2017 (DE) .................... 10 2017 219 495.2

(51) Int. Cl.
*B60R 13/04* (2006.01)
*F16B 5/12* (2006.01)
(Continued)

(52) U.S. Cl.
CPC .............. *B62D 65/16* (2013.01); *B60R 13/04* (2013.01); *B62D 65/06* (2013.01); *F16B 5/12* (2013.01)

(58) Field of Classification Search
CPC ...... B62D 65/16; B62D 65/06; B62D 65/024; B60R 13/04; F16B 5/12
(Continued)

(56) References Cited

U.S. PATENT DOCUMENTS 5,086,586 A     2/1992 Hlavaty et al.
6,196,607 B1 *  3/2001 Gulisano ................. B60R 13/01
                                                      293/115
(Continued)

FOREIGN PATENT DOCUMENTS

CN    103747982 A    4/2014
CN    105804571 A    7/2016
(Continued)

OTHER PUBLICATIONS

PCT/EP2018/076014, International Search Report dated Jan. 14, 2019 (Two (2) pages).
(Continued)

*Primary Examiner* — Sarang Afzali
*Assistant Examiner* — Darrell C Ford
(74) *Attorney, Agent, or Firm* — Crowell & Moring LLP

(57) ABSTRACT

A tolerance compensation system for setting a joint pattern between two outer trim elements to be mounted on respective door frames in the region of a vehicle pillar of a motor vehicle. The tolerance compensation system includes a set of tolerance compensation elements which are insertable into respective cutouts in the door frame and which each have a receiving region for receiving the outer trim elements. The set has at least two different variants of the tolerance compensation elements which differ in terms of the positioning of their respective receiving regions in order to set the joint pattern or the set has only one variant of the tolerance compensation elements in which the receiving region is arranged eccentrically and the tolerance compen- (Continued)

sation elements are insertable into the cutouts in the door frames in two positions rotated through 180° with respect to one another in order to set the joint pattern.

9 Claims, 3 Drawing Sheets

(51) Int. Cl.
  *B62D 65/16* (2006.01)
  *B62D 65/06* (2006.01)
(58) Field of Classification Search
  USPC .................. 29/897.2, 464, 468; 296/1.08
  See application file for complete search history.

(56) References Cited

U.S. PATENT DOCUMENTS

| | | | |
|---|---|---|---|
| 6,942,280 B2* | 9/2005 | Hintzke | B60J 1/006 |
| | | | 296/146.15 |
| 7,717,458 B2* | 5/2010 | Tsuge | B60R 13/02 |
| | | | 280/728.2 |
| 8,844,992 B1* | 9/2014 | Noga | B60R 13/0206 |
| | | | 296/1.08 |
| 11,187,256 B2* | 11/2021 | Benthien | F16B 37/045 |
| 11,198,476 B2* | 12/2021 | Marchlewski | B62D 25/02 |
| 2003/0122400 A1* | 7/2003 | Berglund | B60R 13/04 |
| | | | 296/146.9 |
| 2008/0179917 A1* | 7/2008 | Kaplanov | B60R 13/025 |
| | | | 296/191 |
| 2009/0178255 A1* | 7/2009 | Maciejewski | B60R 13/04 |
| | | | 24/697.1 |
| 2009/0233055 A1* | 9/2009 | White | B62D 29/004 |
| | | | 428/192 |
| 2012/0074725 A1* | 3/2012 | Jeon | B60Q 3/64 |
| | | | 296/1.08 |
| 2014/0191526 A1* | 7/2014 | Lauxen | F16B 5/0657 |
| | | | 296/1.08 |
| 2018/0355646 A1* | 12/2018 | Revelis | E05D 5/121 |
| 2019/0337176 A1* | 11/2019 | Fujino | B26B 29/06 |
| 2020/0070632 A1* | 3/2020 | Vanderpool | B62D 65/024 |
| 2021/0284250 A1* | 9/2021 | Brooks | B62D 65/16 |

FOREIGN PATENT DOCUMENTS

| | | |
|---|---|---|
| DE | 101 59 505 B4 | 6/2003 |
| DE | 10 2016 201 355 A1 | 8/2016 |
| FR | 2 996 503 A1 | 4/2014 |
| WO | WO 2013/034308 A1 | 3/2013 |

OTHER PUBLICATIONS

Chinese Office Action issued in Chinese application No. 201880053483.8 dated Sep. 2, 2021, with English Translation (Eight (8) pages).

* cited by examiner

TOLERANCE COMPENSATION SYSTEM FOR SETTING A JOINT PATTERN BETWEEN TWO OUTER TRIM ELEMENTS TO BE MOUNTED IN THE REGION OF A VEHICLE PILLAR OF A MOTOR VEHICLE

CROSS REFERENCE TO RELATED APPLICATIONS

This application is a continuation of PCT International Application No. PCT/EP2018/076014, filed Sep. 25, 2018, which claims priority under 35 U.S.C. § 119 from German Patent Application No. 10 2017 219 495.2, filed Nov. 2, 2017, the entire disclosures of which are herein expressly incorporated by reference.

BACKGROUND AND SUMMARY OF THE INVENTION

The invention relates to a tolerance compensation system for setting a joint pattern between two outer trim elements to be mounted in the region of a vehicle pillar of a motor vehicle. Furthermore, the invention relates to a fastening arrangement comprising two outer trim elements fastened to respective door frames in the region of a vehicle pillar of a motor vehicle.

In motor vehicles, outer trim elements are frequently mounted as lining elements on the outside of vehicle doors with door frames for optical reasons, among other reasons. For as high-quality an appearance as possible, it is usually desirable to set a very particular joint pattern between the outer trim elements. This means that, preferably, a joint between these two outer trim elements should have a small gap size with high parallelism within relatively tight tolerance ranges.

DE 101 59 505 B4 discloses a setting element for orienting an outer trim element mounted on a vehicle door. The setting element comprises a housing-type bracket for receiving the outer trim element. The bracket can be fastened to the vehicle door by means of screws. By means of the screws, the bracket can be displaced in the vehicle longitudinal direction, with the result that the outer trim element mounted on the setting element is likewise displaced in a corresponding manner. However, this represents a relatively complicated solution for setting a joint pattern between the outer trim element and a further outer trim element.

Therefore, it is the object of the present invention to provide as simple a solution as possible for setting a joint pattern between two outer trim elements to be mounted on respective door frames in the region of a vehicle pillar of a motor vehicle.

The tolerance compensation system according to the invention for setting a joint pattern between two outer trim elements to be mounted on respective door frames in the region of a vehicle pillar of a motor vehicle comprises a set of tolerance compensation elements, which are insertable into respective cutouts in the door frame and each have a receiving region for receiving the outer trim elements. According to the invention, the set has at least two different variants of the tolerance compensation elements, which differ in terms of the positioning of their respective receiving regions in order to set the joint pattern. Alternatively, according to the invention, the set has only one variant of the tolerance compensation elements, in which the receiving region is arranged eccentrically, and the tolerance compensation elements are insertable into the cutouts in the door frames in two positions rotated through 180° with respect to one another in order to set the joint pattern.

The receiving regions of the tolerance compensation elements can be for example a bore with an internal thread, such that respective outer trim elements can be fastened to the tolerance compensation elements for example via a screw connection and can thus be fastened to the door frames of respective vehicle doors by means of the tolerance compensation elements. Of course, the receiving regions can also be configured in some other way in order to remove and fix the outer trim elements.

The tolerance compensation elements thus serve to receive the respective outer trim elements. The tolerance compensation elements can be inserted into respective cutouts in the door frames and be fixed to the door frames. In the first alternative according to the invention, in which the set has the at least two different variants of the tolerance compensation elements, the joint pattern can be established in that, depending on the joint pattern, the different variants of the tolerance compensation elements are inserted into the respective cutouts in the respective door frames. Since the receiving regions of the different variants of the tolerance compensation elements differ in terms of their respective positioning, the joint pattern can be easily set as desired. Of course, it is also possible, in this alternative according to the invention, for more than the two different variants of the tolerance compensation elements to be provided, wherein the different variants then differ in terms of the positioning of their respective receiving regions.

In the second alternative solution according to the invention, having the only one variant of the tolerance compensation elements, the setting of the joint pattern can be achieved in that the tolerance compensation elements are inserted into the cutouts in the door frames in their respectively appropriate position. Since the receiving regions are arranged eccentrically, depending on the selected position according to which the tolerance compensation elements are inserted into the cutouts in the door frames, respective setting or adaptation of the joint pattern results. This is because, depending on the position of the tolerance compensation elements, a joint between the respective outer trim elements is locally widened or narrowed.

When the tolerance compensation system according to the invention is used, complicated reworking for setting the joint pattern after fitting or after mounting of the outer trim panels can be dispensed with. Very different tolerances of the door frames and also of further components of the respective motor vehicle have an influence on the setting of the joint pattern. In the solution according to the invention, the tolerance compensation elements simply have to be selected appropriately or arranged appropriately in order to set the joint pattern as desired. In the event of geometric alterations for example to the door frames, it is possible to react particularly quickly and easily, since all that is necessary is for the appropriate tolerance compensation elements to be selected or to be inserted into the respective cutouts in the door frames in an appropriately oriented manner. In particular, when the tolerance compensation system according to the invention is used, complicated tool changes no longer occur in order if necessary to adapt the location of the respective cutouts in the door frames. By means of the tolerance compensation system according to the invention, it is thus very easily possible to set a joint pattern with a neat visual appearance between the two outer trim elements.

In an advantageous embodiment of the invention, in the case in which the set has the at least two different variants of the tolerance compensation elements, the latter each have a form that allows the insertion of the tolerance compensation elements into the cutouts in the door frames only in a respectively variant-specific position. Preferably, the different variants of the tolerance compensation elements each have a protrusion, which allows the tolerance compensation elements to be fitted in the cutouts in the door frames only in their respectively variant-specific position. Preferably, therefore, the poka yoke principle takes effect. The different variants of the tolerance compensation elements can therefore be inserted into the cutouts in the door frames only in their variant-specific position. Accidental mix-ups by fitters with regard to the tolerance compensation elements to be selected can be easily avoided as a result.

In a further advantageous embodiment of the invention, in the case in which the set has the at least two different variants of the tolerance compensation elements, the latter are different colors. Fitters can thus very easily see from the different coloring which tolerance compensation elements to use specifically for setting the joint pattern. In this way, mixing up of the different variants of the tolerance compensation elements is virtually ruled out.

According to a further advantageous embodiment of the invention, the tolerance compensation elements have a protuberance for inserting into the cutouts in the door frames in a form-fitting manner. As a result, the tolerance compensation elements can be arranged particularly easily in the cutouts in the door frame by inserting the protuberance.

In a further advantageous embodiment of the invention, the tolerance compensation elements are formed in one piece. As a result, the tolerance compensation elements have a particularly simple construction and can additionally also be produced in a particularly cost-effective manner. Preferably, the tolerance compensation elements are produced by injection-molding, i.e., are preferably in the form of injection-molded parts. As a result, the tolerance compensation elements can be mass produced in a particularly simple and cost-effective manner.

In a further advantageous configuration of the invention, the tolerance compensation elements each have at least one snap-in element for forming a snap-in connection with the door frames. As a result, the tolerance compensation elements can be fixed to the door frame particularly quickly and easily. Of course, it is also possible for several of these snap-in elements to be provided.

The fastening arrangement according to the invention comprises two outer trim elements fastened to respective door frames in the region of a vehicle pillar of a motor vehicle, the outer trim elements being fastened to the door frames by means of at least one tolerance compensation element, inserted into respective cutouts in the door frames, according to the tolerance compensation system according to the invention or an advantageous embodiment of the tolerance compensation system according to the invention. Advantageous configurations of the tolerance compensation system according to the invention should be considered to be advantageous configurations of the fastening arrangement according to the invention and vice versa.

Further advantages, features and details of the invention will become apparent from the following description of preferred exemplary embodiments and with reference to the drawing. The features and combinations of features mentioned above in the description and the features and combinations of features that are disclosed below in the description of the Figures and/or shown only in the Figures are usable not only in the combination specified in each case but also in other combinations or on their own without departing from the scope of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
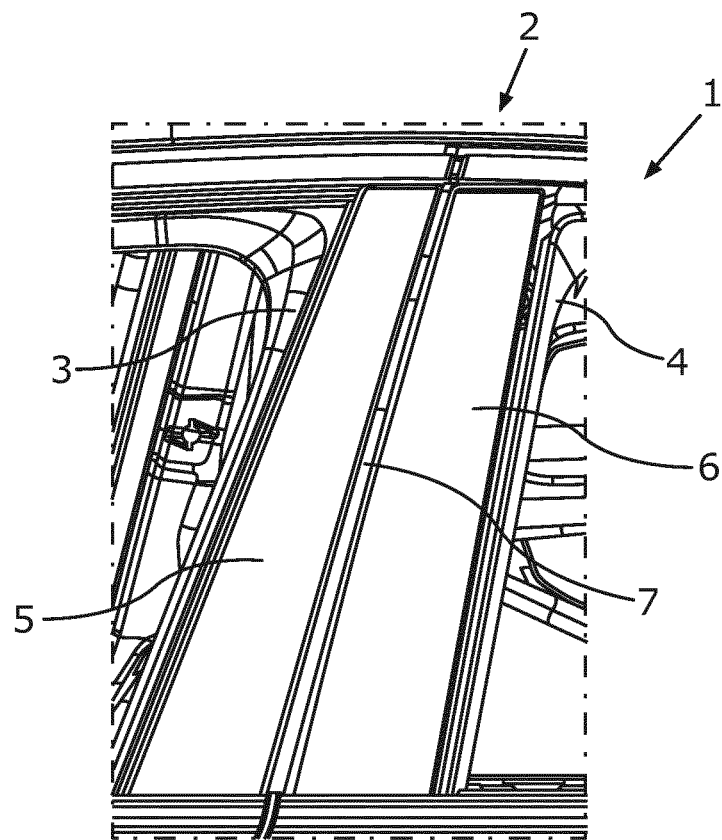
FIG. 1 shows a side view of a detail of a vehicle body in the region of a B pillar, wherein a fastening arrangement of two outer trim elements fastened to respective door frames is shown.

A fastening arrangement 1 in the region of a B pillar 2 of a motor vehicle is shown in a side detail view. The B pillar 2 is adjoined by respective door frames 3, 4 of a front door and rear door that are not described in more detail. Mounted on the two door frames 3, 4 are respective outer trim elements 5, 6, between which a joint 7 is formed.

An essential criterion when mounting the outer trim elements 5, 6 relates in this case to the joint pattern of the joint 7 between the two outer trim elements 5, 6. Ideally, the joint 7 should have substantially the same width and constant high parallelism along the entire length of the two outer trim elements 5, 6 within certain tolerances. On account of very different tolerances, this can turn out to be relatively difficult. For example, on account of manufacturing tolerances, it is possible for the door frames 3, 4 to be subject to certain tolerance fluctuations. Furthermore, it is also possible for example for certain mounting points on a body of the motor vehicle to be subject to tolerances, with the result that the door frames 3, 4 are not always oriented in an exactly identical manner with respect to one another. In order to ensure as high-quality an appearance as possible, it is necessary, however, for a joint pattern that is as good as possible and is always the same to result.

Figure 2:
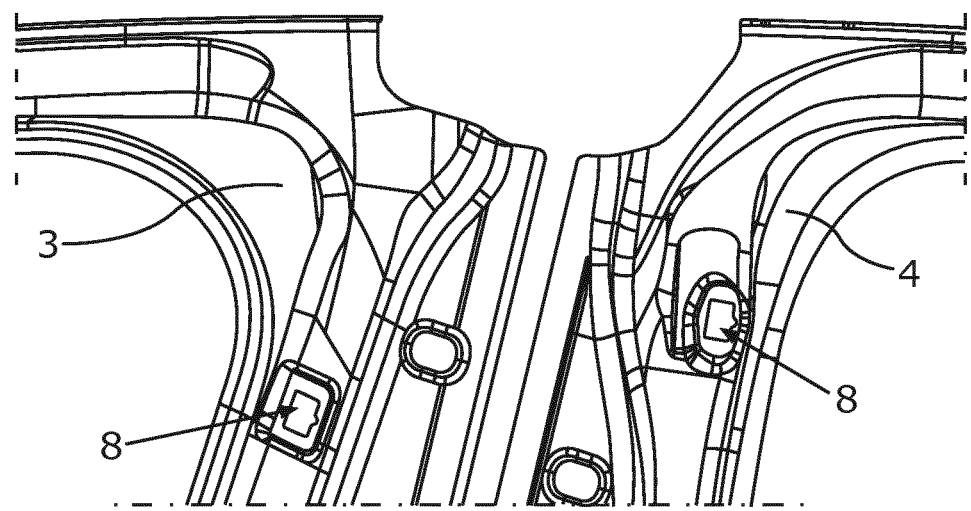
FIG. 2 shows a side view of the two partially illustrated door frames, which have respective cutouts into which respective tolerance compensation elements can be inserted in order to set a joint pattern between the two outer trim elements.

In FIG. 2, the two door frames 3, 4 are illustrated in detail in a side view. The door frames 3, 4 have a plurality of cutouts 8. The cutouts 8 are in the form of through-openings.

Figure 3:
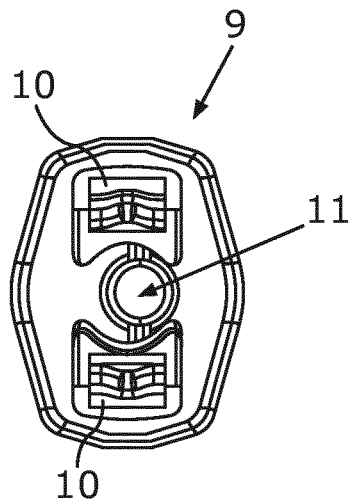
FIG. 3 shows a plan view of a first variant of the tolerance compensation elements that are insertable into the cutouts, the first variant having a receiving region in the form of a through-opening for receiving the outer trim elements.

FIG. 3 shows a first variant of a tolerance compensation element 9 in plan view. The tolerance compensation element 9 can be inserted into the respective cutouts 8 in the door frames 3, 4. The tolerance compensation element 9 has two snap-in elements 10, which serve to enter into a snap-in connection with the door frames 3, 4 as soon as the tolerance compensation element 9 has been inserted into one of the cutouts 8. In addition, the tolerance compensation element 9 has a receiving region 11, configured as a through-opening or bore, for receiving the respective outer trim elements 5, 6.

The tolerance compensation element 9 is formed in one piece and is produced preferably by injection-molding. As a result, the tolerance compensation element 9 can be produced in large quantities particularly quickly and economically.

Figure 4:
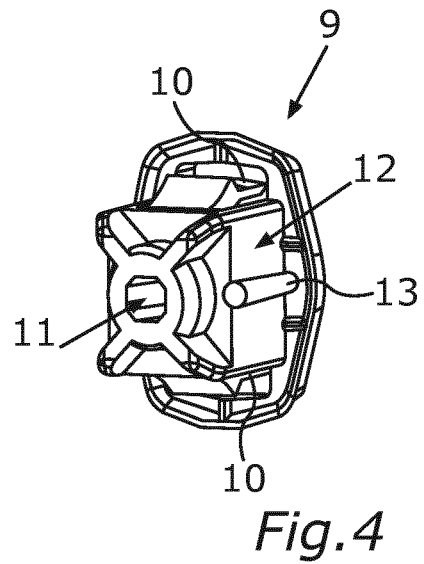
FIG. 4 shows a perspective rear view of the first variant of the tolerance compensation element.

FIG. 4 shows the tolerance compensation element 9 in a perspective rear view. The tolerance compensation element 9 comprises a protuberance 12, which is adapted to the hole geometry of the cutouts 8 in the door frames 3, 4. The tolerance compensation element 9 can be inserted into the respective cutouts 8 in the door frames 3, 4 in a form-fitting manner by way of the protuberance 12. In order that the tolerance compensation element 9 can be inserted into the respective cutouts 8 in the door frames 3, 4 only in a very particular position, a protrusion 13 is provided on the outside of the protuberance 12, the protrusion 13 corresponding to the shaping of the cutouts 8 in the door frames 3, 4. This ensures that the tolerance compensation element 9 can be inserted into the respective cutouts 8 in the door frames 3, 4 only in a very particular position.

Figure 5:
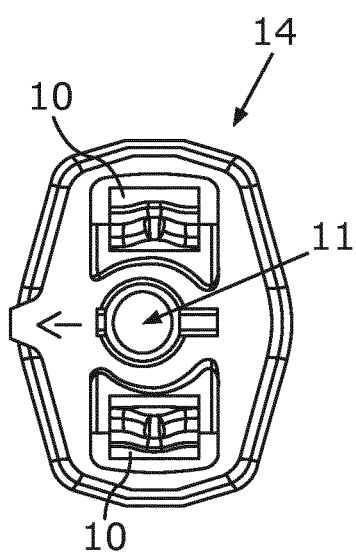
FIG. 5 shows a plan view of a second variant of the tolerance compensation elements, which differs from the first variant by the positioning of the receiving region.

FIG. 5 shows a second variant of a tolerance compensation element 14 in plan view. The tolerance compensation element 14 differs from the tolerance compensation element 9 only in that the receiving region 11, configured as a through-opening or bore, is positioned differently than in the case of the tolerance compensation element 9. For example, the two tolerance compensation elements 9, 14 differ in terms of the positioning of their receiving regions 11 as regards their respective eccentricity with respect to a central axis that is not illustrated here. Just like the tolerance compensation element 9, the tolerance compensation element 14 likewise has a protrusion 13 in the region of its protuberance 12 (not discernible here), such that the tolerance compensation element 14, too, can be inserted into the respective cutouts 8 in the door frames 3, 4 only in a very particular position.

Figure 6:
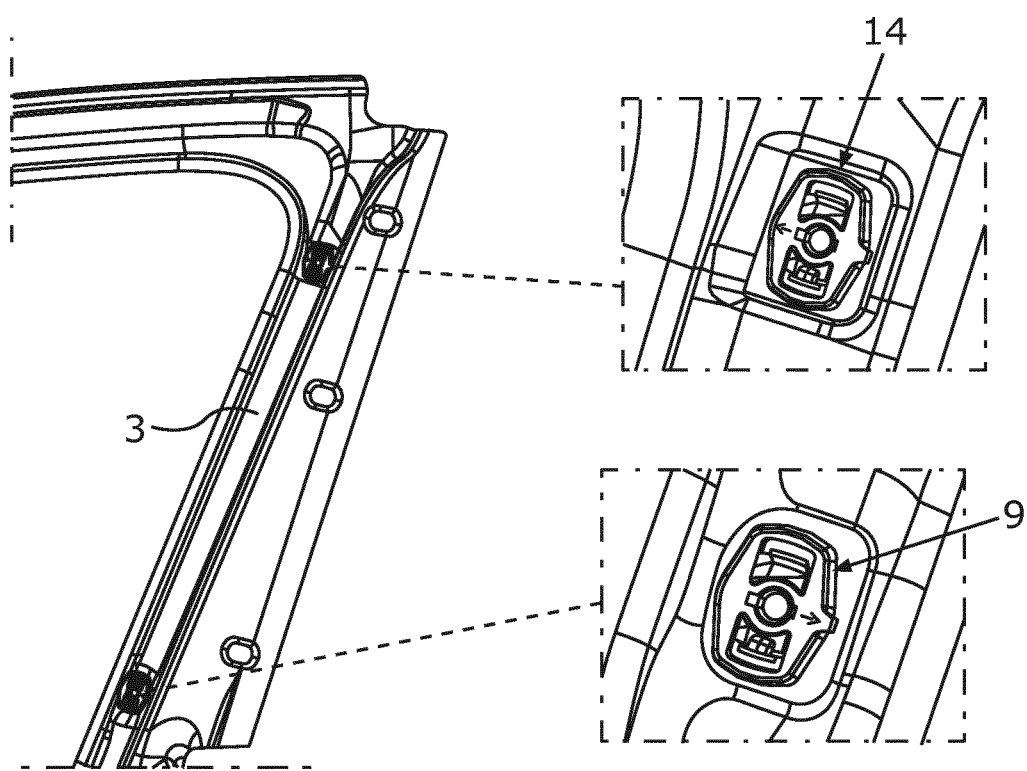
FIG. 6 shows a side view in which one of the two door frames is shown, wherein the two variants of the tolerance compensation elements have been inserted into the respective cutouts in the door frames.

FIG. 6 shows the door frame 3 of the front door in detail in a side view, wherein the two variants of the tolerance compensation elements 9, 14 have been inserted into the cutouts 8, which are not identified here. If the joint pattern of the joint 7 between the outer trim elements 5, 6 turns out to be unfavorable across for example different batches of the door frames 3, 4, the variants of the tolerance compensation elements 9, 14 that are suitable in each case for appropriately influencing the joint pattern can be inserted into the different cutouts 8 in the door frames 3, 4. On account of the different positioning of the respective receiving regions 11 of the tolerance compensation elements 9, 14, the joint pattern of the joint 7 between the outer trim elements 5, 6 can as a result be easily corrected as desired.

This results in a particularly rapid reaction time given changing geometric boundary conditions as regards the joint pattern of the joint 7 between the outer trim elements 5, 6. For example, expensive changes of tool for a possible hole-position correction of the cutouts 8 can be dispensed with. Instead, all that is necessary is for the appropriate variants of the tolerance compensation elements 9, 14 to be arranged in the respective cutouts 8 in order to correct the joint pattern of the joint 7 as desired. The two variants of the tolerance compensation elements 9, 14 in this case form a tolerance compensation system for setting the joint pattern of the joint 7 between the two outer trim elements 5, 6. Preferably, the two different variants of the tolerance compensation elements 9, 14 are different colors, such that fitters can easily identify which variant of the tolerance compensation elements 9, 14 to use specifically for mounting and positioning the outer trim elements 5, 6.

It is also possible for the tolerance compensation system, rather than the two different variants of the tolerance compensation elements 9, 14, to have only one variant of a tolerance compensation element that is not illustrated here. In this case, the receiving region 11 is arranged eccentrically in the single variant of the tolerance compensation element, wherein this single variant of the tolerance compensation element can be arranged in the cutouts 8 in the door frames 3, 4 in two positions rotated through 180° with respect to one another in order to set the joint pattern. In this embodiment of the tolerance compensation system, the joint pattern is set easily in that, depending on the joint pattern, the single variant of the tolerance compensation elements is arranged within the respective cutouts 8 in the door frames 3, 4 in a manner rotated about an axis extending through the receiving region 11, such that, on account of the eccentricity of the receiving regions 11, the joint pattern is corrected as desired.

LIST OF REFERENCE CHARACTERS

1 Fastening arrangement
2 B pillar
3 Door frame
4 Door frame
5 Outer trim element
6 Outer trim element
7 Joint between the outer trim elements
8 Cutout
9 Tolerance compensation element
10 Snap-in element
11 Receiving region
12 Protuberance
13 Protrusion
14 Tolerance compensation element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tolerance compensation system for setting a joint pattern between two outer trim elements to be mounted on a respective door frame in a region of a vehicle pillar of a motor vehicle, comprising:
   a set of tolerance compensation elements, wherein the tolerance compensation elements are each insertable into a respective cutout in the respective door frame and each have a respective receiving region for receiving a respective one of the two outer trim elements, wherein each respective receiving region is a circumferentially closed bore and wherein a respective portion of the respective trim element is receivable in the respective circumferentially closed bore;
   wherein the set has at least two different variants of the tolerance compensation elements which differ in terms of a positioning of the respective receiving region in order to set the joint pattern; or
   wherein the set has only one variant of the tolerance compensation elements in which the respective receiving region is arranged eccentrically and the tolerance compensation elements are each insertable into the respective cutout in the respective door frame in two possible positions rotated through 180° with respect to one another in order to set the joint pattern.

2. The tolerance compensation system according to claim 1, wherein the set has the at least two different variants of the tolerance compensation elements and wherein the tolerance compensation elements each have a form that allows an insertion of the tolerance compensation elements into the respective cutout in the respective door frame only in a respective variant-specific position.

3. The tolerance compensation system according to claim 2, wherein the at least two different variants of the tolerance compensation elements each have a protrusion which allows the tolerance compensation elements to be fitted in the respective cutout in the respective door frame only in the respective variant-specific position.

4. The tolerance compensation system according to claim 1, wherein the set has the at least two different variants of the tolerance compensation elements and wherein the tolerance compensation elements have a different color.

5. The tolerance compensation system according to claim 1, wherein the tolerance compensation elements each have a protuberance for inserting into the respective cutout in the respective door frame in a form-fitting manner.

6. The tolerance compensation system according to claim 1, wherein the tolerance compensation elements are each formed in one piece.

7. The tolerance compensation system according to claim 1, wherein the tolerance compensation elements are injection-molded parts.

8. The tolerance compensation system according to claim 1, wherein the tolerance compensation elements each have a respective snap-in element for forming a snap-in connection with the respective door frame.

9. A fastening arrangement, comprising:
two outer trim elements each fastened to a respective door frame in a region of a vehicle pillar of a motor vehicle;
wherein the two outer trim elements are fastened to the respective door frame by the set of tolerance compensation elements according to claim 1 which are each inserted into a respective cutout in the respective door frame.

* * * * *